United States Patent [19]

Smith

[11] 4,073,483
[45] Feb. 14, 1978

[54] SUPPORTING DEVICE

[75] Inventor: Jack James Smith, Daventry, England

[73] Assignee: BOC Limited, London, England

[21] Appl. No.: 760,698

[22] Filed: Jan. 19, 1977

[30] Foreign Application Priority Data

Jan. 21, 1976 United Kingdom ............. 239876/76

[51] Int. Cl.² .............................................. B25B 1/04
[52] U.S. Cl. ..................... 269/25; 269/127; 269/287; 269/321 W
[58] Field of Search ........... 29/200 P, 200 J, 149.5 R; 269/25, 43, 127–129, 268, 287, 321 W

[56] References Cited

U.S. PATENT DOCUMENTS

| 2,270,548 | 1/1942 | Olson | 269/127 |
| 2,354,794 | 8/1944 | Buehler | 269/129 |
| 3,129,500 | 4/1964 | Brown | 269/127 |

Primary Examiner—Robert C. Watson
Attorney, Agent, or Firm—Dennison, Dennison, Meserole & Pollack

[57] ABSTRACT

A device for supporting separate parts of a flanged plain bearing so that they can be welded together. The device comprises a main body part having an arcuate seating across its upper surface and a planar side surface adjoining such seating.

There are provided means to clamp an arcuate shell in the seating and means to clamp a separate flange against the side surface with the edges of shell and the flange, to be joined together, in abutment and exposed for welding. The latter clamping means includes a clamping element movable to a position in which it engages the face of the flange remote from the side surface to hold it firmly against such surface.

14 Claims, 6 Drawing Figures

SUPPORTING DEVICE

FIELD OF THE INVENTION

This invention relates to devices for supporting, components on which operations are to be performed, and particularly, but not exclusively, to such devices for supporting flanged plain bearings during their manufacture.

BACKGROUND TO THE INVENTION

Hitherto, flanged bearings have been made from arcuate blanks which are clamped in complementary arcuate seatings provided in respective guide blocks of several sets of co-operating dies by a force applied to the parting lines of the blanks. The blanks project laterally beyond side surfaces of the blocks and the projecting portions of the blanks are bent in the sets of dies in a corresponding series of steps until they lie in planes at right angles to the axis of the arcuate central portion of the bearing. The bent blank then has to be machined to form the finished bearing. For individual specialized manufacture of large bearings, e.g. 1 inch of more thick and 2 or 3 feet in diameter, it has been known to form such bearings from arcuate shells and separate flanges which are joined either by using a "clip on" design of flange and shell or by welding, e.g. electron beam welding or spot welding. In such specialized large scale fabrications, it was possible merely to hold the parts in abutment during the welding operation.

It is now considered that a practical method for mass production of flanged plain bearing of standard and other sizes could be achieved by welding together separate shells and flanges using a laser. The present invention is concerned with providing for such manufacture a device capable of supporting the component parts of the bearing ready for welding using a laser.

SUMMARY OF THE INVENTION

The invention provides a device suitable for locating parts of a flanged plain bearing which are to be joined together to form the finished article, which device comprises a body part having an arcuate seating surface extending across an upper surface of the body part, at least one substantially planar side surface area adjoining the seating surface, means to clamp arcuate bearing shells in the seating surface and means to clamp a separate bearing flange against the side surface area with the edges of the arcuate bearing shell and the flange, to be joined together, in abutment and exposed for welding by a laser beam, which latter means includes a movably mounted clamping member for engaging the face of the flange remote from said surface area, and means to move the clamping member between a position in which it exerts a force against the flange to hold it against the side surface area and a free position in which such force is released.

Preferably projections are provided on the side surface area which projections are located for engagement by the arcuate edge, remote from the edge to be welded, of a flange located in use against the side surface area so as to facilitate the correct location of the flange before the clamping force is applied.

When a bearing having a flange at each end is to be manufactured, a device according to the invention may include a pair of movably mounted clamping members for clamping respective flanges against planar surfaces on opposite side of the body part, and means to move the elements into their clamping positions. Said last mentioned means may comprise contractable means engageable with the members at positions spaced from their pivots, the arrangement being such that when such means are contracted the members are pivoted towards one another so as to exert and maintain the clamping forces on the flanges.

The body part may have a detachable upper section on which the seating surface and said side surface area(s) are provided which upper section can readily be replaced by a similar insert for manufacture of a bearing having different dimensions. If this feature is adopting the clamping members preferably have removable end sections for engagement with bearing flanges, which sections can be replaced by other such end sections of different dimensions to accomodate different size bearings in the device.

DETAILED DESCRIPTION

Figure 1:
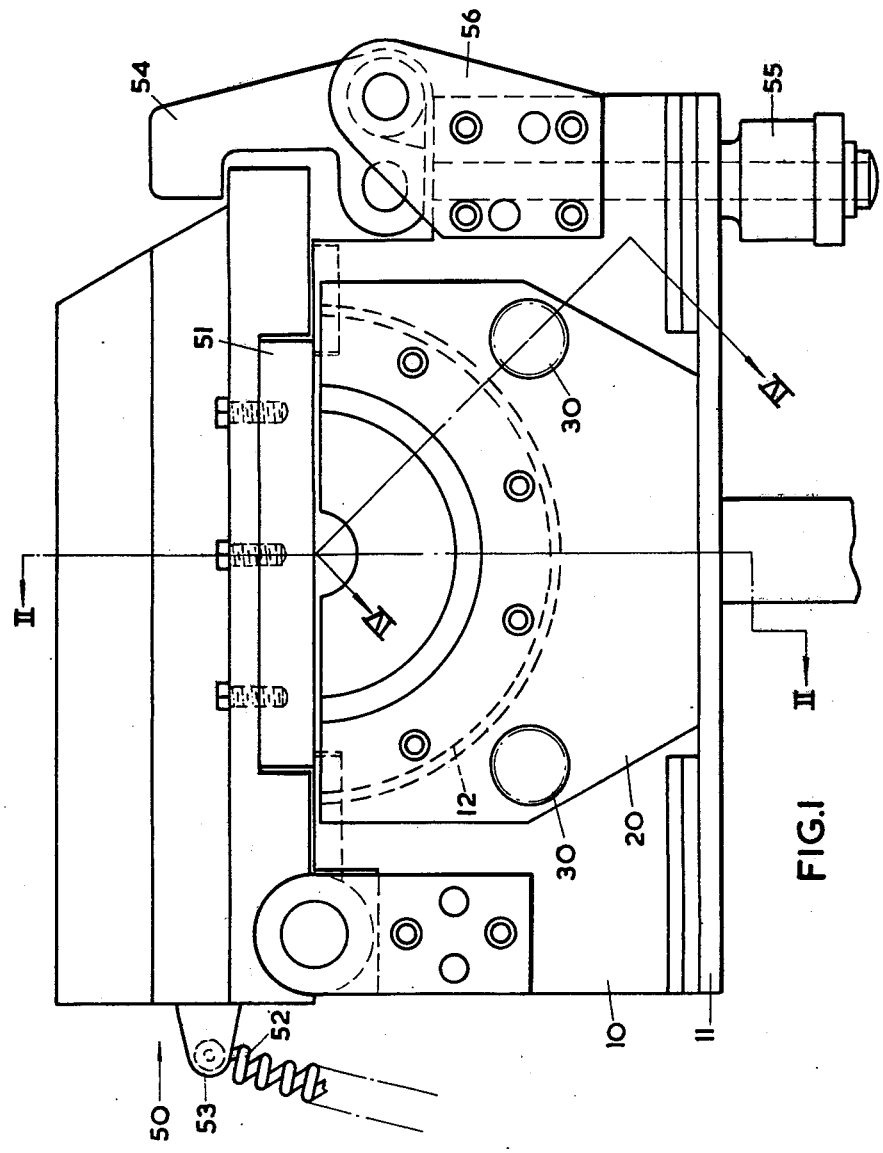
FIG. 1 is a side view of a support device embodying the invention.
Figure 2:
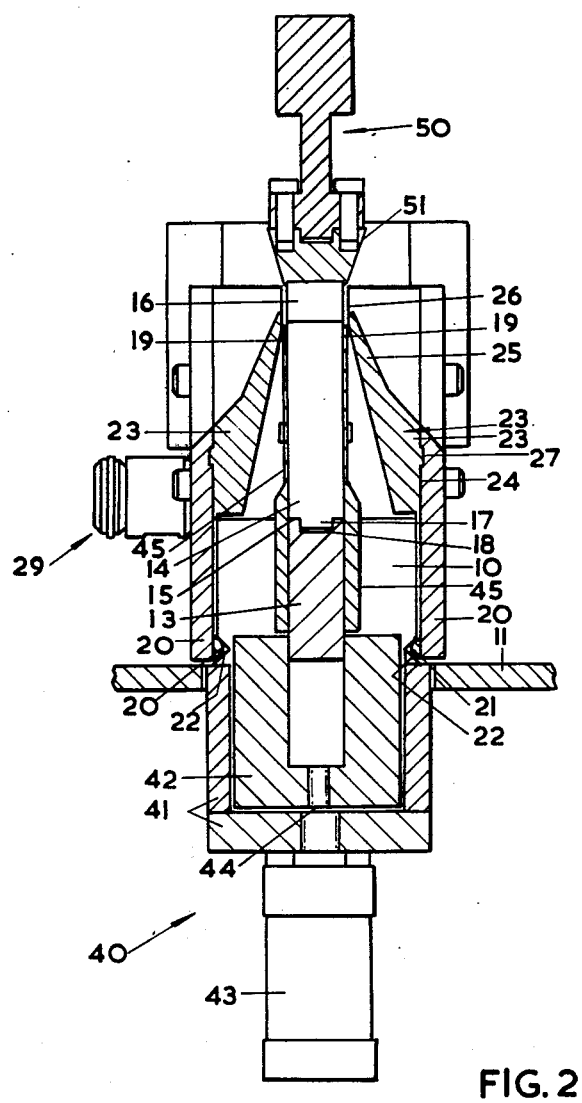
FIG. 2 is a cross-sectional view of the device of FIG. 1 taken along the line 2—2 in FIG. 1.

Referring to FIGS. 1 to 4 of the drawings, there is shown a jig for supporting parts of a flanged plain bearing which are to be welded together using a laser. The jig comprises a main base block 10 secured to the working surface 11. The block 10 has an arcuate recess 12 in its upper surface which recess extends across the width of the block 10 and receives the seat for the bearing. A central portion of the block 10 (as viewed in FIG. 1) reduces in width to provide a narrow web 13 as seen in FIG. 2. A seating 14 for the bearing comprises a further block having a lower arcuate surface 15, complementary to the surface 12 of the recess in the block and an upper arcuate seating surface 16 for receiving an arcuate bearing blank to which end flanges are to be joined. The surface 15 of the seating is provided with a projecting key 17 which engages in a corresponding keyway 18 in the surface 12 of the block 10 to laterally locate the seating 14 with respect to the block. The seating 14 has planar side surfaces adjoining, and perpendicular to the axis of, the seating surface 16 for the bearing blank. The end flanges to be joined to the blank are held against these side surfaces 19 by clamping members described below, so that the inner arcuate edges of the flanges are held in contact with the arcuate edges of a bearing blank with the abutting edges exposed for welding together using a laser.

Figure 3:
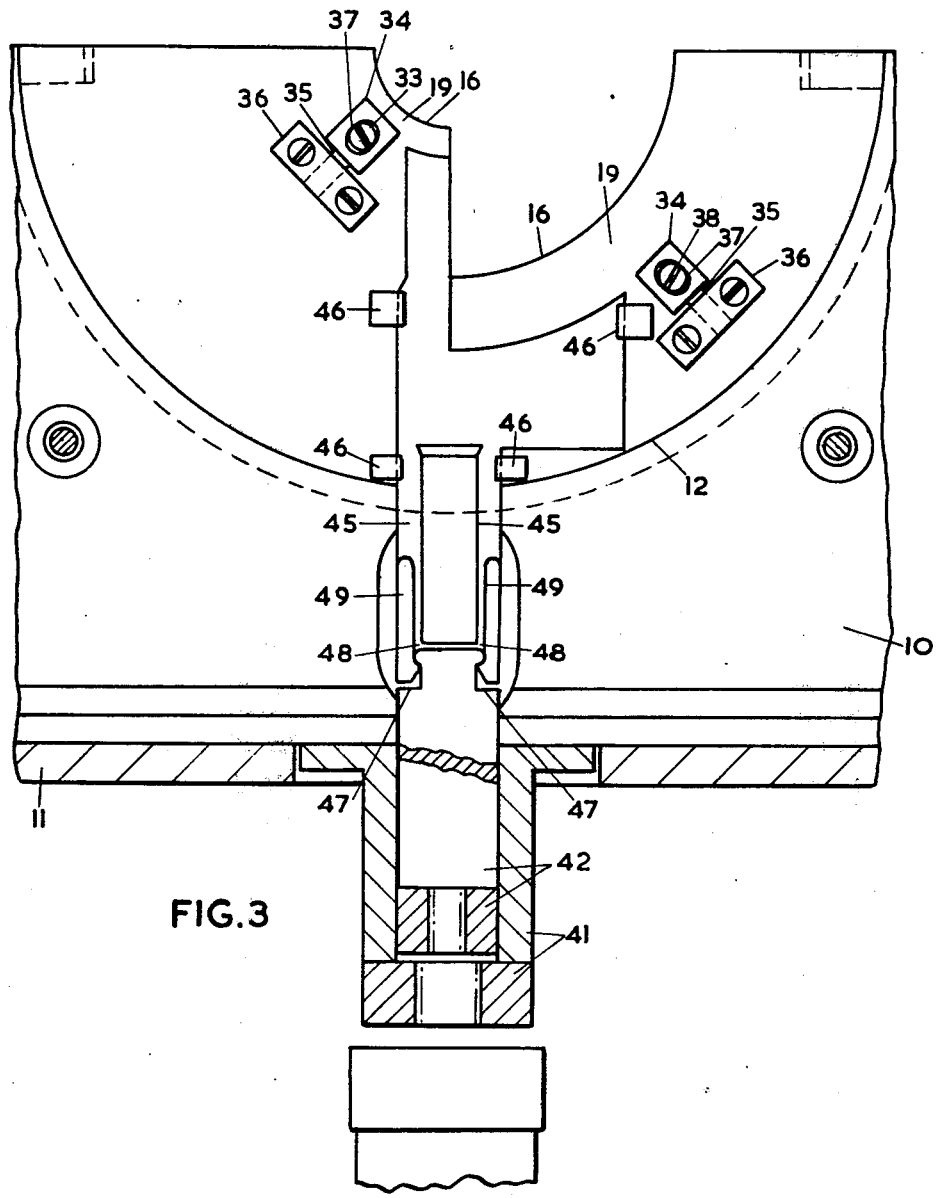
FIG. 3 is a side view of a central part of a device of FIG. 1 with the clamping plate thereof removed.
Figure 4:
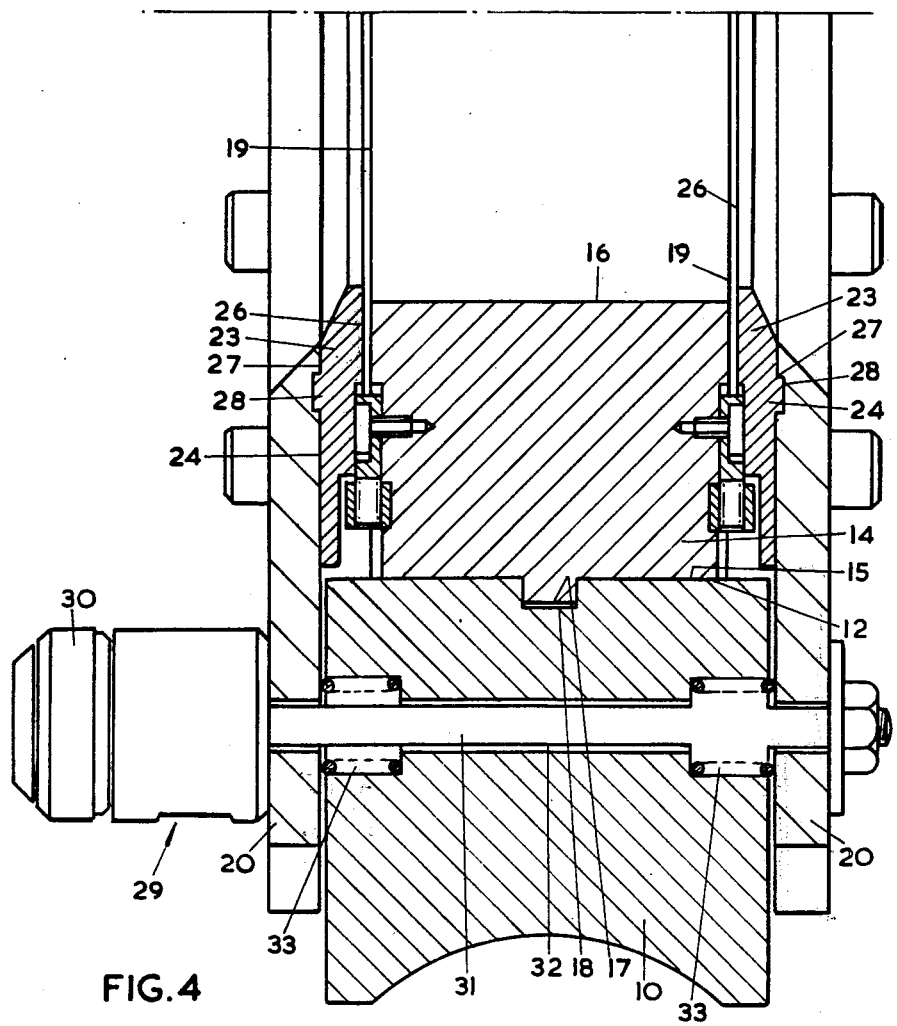
FIG. 4 is a cross sectional view of the device of FIG. 1 taken along line 4—4 in FIG. 1.

The above mentioned device for clamping the end flanges against the side surfaces 19 of the seating, comprises two clamping plates 20 one on either side of the block 10. Along the lower edge of each plate 20 there is provided a beading 21 which has a rounded profile. Each beading 21 engages in a respective channel 22 formed in the side surfaces of the block 10. The channels 21 have inclined side surfaces against which the rounded beadings 21 engage to provide a hinge or pivotal connections between the plates 20 and the block 10. Arcuate clamping members 23 are detachably connected to the inner surfaces of the plates 20 adjacent the upper edges thereof. Each clamping member 23 comprises an arcuate part having a relatively large base part having a planar surface 24 in contact with the inner surface of a respective plate 20. The member 23 tapers in the upward direction to provide a projecting finger 25 which terminates adjacent the side surfaces 19 of the seating 14. Each finger 25 is provided with a flat surface 26 at its upper end for engaging a side surface of a flange to press it and thereby clamp it against the adjacent side surface 19 of the seating 14. Each clamping member 23 is located with respect to a clamping plate 20 by an arcuate key 27 projecting from its flat surface 24 into a corresponding key-way 28 provided in the corresponding side surface of the associated plate 20. The clamping plates 20 are moved into and out of the clamping position by a contractable operating device 29 which is best illustrated in FIG. 4. The device 29 comprises a compact hydraulic ram device 30 which comprises a main body part providing an internal cylinder in which a piston is slidably mounted. Hydraulic fluid can be fed into such cylinder to axially displace the piston thereby expanding the device. Such a device is a standard part which is sold under the registered trade mark POWR-LOCK. A headed piston rod 31 passes through the piston of the ram 30 and extends through the plates 20 and through a bore 32 in the block 10. Opposite ends of the bore 32 are enlarged to receive disc springs 33 which act between the block and the plates 20 to normally maintain the clamping members 23 in a free position in which end bearing flanges can be inserted between the fingers and the opposed side surfaces 19 of the seating 14. It will be appreciated that hydraulic fluid can be introduced into the device 29 to effect expansion of the device permitting the plates 20 to be moved against the disc springs 33 to the closed position. When the hydraulic pressure is applied to the device 29 it then operates to expand the device thereby drawing a portion of the piston rod 32 further into the body part of the ram 30 which causes plates 20 to pivot towards one another thereby bringing clamping elements 23 into firm engagement with end flanges inserted between those members and the side surfaces of the seating 19. The lower edges of such end flanges abut location pads 34 fixed to the side surfaces 19 of seat 14 as seen in FIG. 3. The pads 34 have a stem 35 slidably received in mountings 36 fixed to the seat 14. The pads 34 have apertures 37 therethrough which are elongate in a direction along radii of the arcuate seating surface 16 of the seat 14. Screws 38 passing through the apertures 37 clamp the pads in the desired positions, the apertures 37 being made elongate as aforesaid to allow a limited sliding movement of the pads 34 to permit adjustment thereof.

A mechanism 40 is provided to eject a completed flanged bearing from the jig. A housing 41 is provided in and extends downwardly from the working surface 11 to which the jig is connected. A 'U-shaped' or yoke member 42 is slidably mounted in the housing 41 and has a pair of arms which embrace the web portion 13 of the block 10. Pneumatic ram 43 is located below the housing 41 and has a piston rod 44 which extends through a bottom wall of the housing 41 and is connected to the member 42 to effect a sliding movement of that member when the ram is acuated. Elongate ejector fingers 45 rest on the upper surface of the member 42 and project upwardly therefrom to a position adjacent the lower edge of a flange clamped by clamping members 23 against side surfaces 19 of the seat 14. The fingers are guided for longitudinal movement by brackets 46 which are fixed to the seat 14 and have offset projecting portions which engage over the lateral edges of the fingers 45. Upward movement of the member 42 causes the fingers to move upwardly to engage the lower ends of a flange of a finished bearing in the seat 14 to eject such a bearing therefrom after the clamping force of clamping members 23 has been removed. Opposite upper edges of the arms of the member 42 are removed to form steps 47 as shown in FIG. 3 and elongate beadings are provided along the upper edges of the vertical portions of the steps 47. The fingers 45 are formed at their lower end with a pair of clips 49 which resiliently engage over the beadings 48 so that downward movement of the member 42 pulls the fingers downwardly with it.

A clamping head 50 is pivotally mounted on the block 10. A pressure bar 51 is secured in a recess in the underside of the head 50. As seen in FIG. 2 the head 50 and pressure bar 51 are relatively narrow so that a laser beam can be directed at the abutting edges of an arcuate blank and end flanges located in the jig in order to weld together such edges. The head 50 is biassed by a spring 52, connected to a lug 53 on the head 50, to its raised position. The head is moveable against the bias of the spring 52 to its lowered position and is held in such position by a latch member 54 pivotally mounted in hinge plates 56 on the block 10. The latch member 54 is in the form of a bell-crank lever with one part of such lever providing the latching device and the other part of such lever being connected to a further hydraulic ram device 55 operable to move such arm thereby moving member 54 into and out of its latching position.

In use with the head 50 in its raised position and the clamping plates 20 in their free positions an arcuate bearing blank is located in the seating surface 16 and a pair of arcuate end flanges are located against respective side surfaces 19 of the seat 14 with their lower edges abutting the location pads 34. The ram 30 is actuated to bring clamping members 23 into their clamping positions so that the end flanges are gripped against surfaces 19 with their upper arcuate edges in contact with the arcuate edges of the bearing blank, such abutting edges being exposed for welding using a laser. The head 50 is then moved into its lowered position and the latch 54 engaged therewith to hold the head in such position whereby the arcuate blank is firmly seated in surface 16. The abutting edges of the arcuate blank and its end flanges are then welded together using a laser. The latch 54 is then released so that the head 50 moves to its raised position and the ram 30 is contracted so that the clamping force exerted by member 23 is released. The finished bearing is then ejected from the jig by actuating ram 43 which causes fingers 45 to be moved sharply upwardly to engage the lower edges of the flanges to eject the bearing.

It will be appreciated that the above jig can be used to accommodate flanged bearings of different diameters and widths simply by replacing the seat 14 with another seat of another width and different diameter seating surface 16, and also by replacing clamping members 23 by other such members which can accommodate a bearing seating 14 of a different width. FIG. 3 shows two different seatings in the jig on either side of the vertical centre line of this figure. As the fingers 45 are connected to the seating 14 by brackets 46 such fingers are also removed when seating 14 is removed and further fingers are provided with the new seating. As can be seen from FIG. 3 the fingers used with a seat having a larger diameter seating surface 17, have an enlarged head compared with such fingers used with a seat having a smaller diameter seating surface 16. When a seat 14 is removed or inserted from block 10 the clips 49 of the fingers 45 resiliently disengage or engage with beadings 48 on yoke member 42 to allow the fingers to remain associated with the seat 14.

Figure 5:
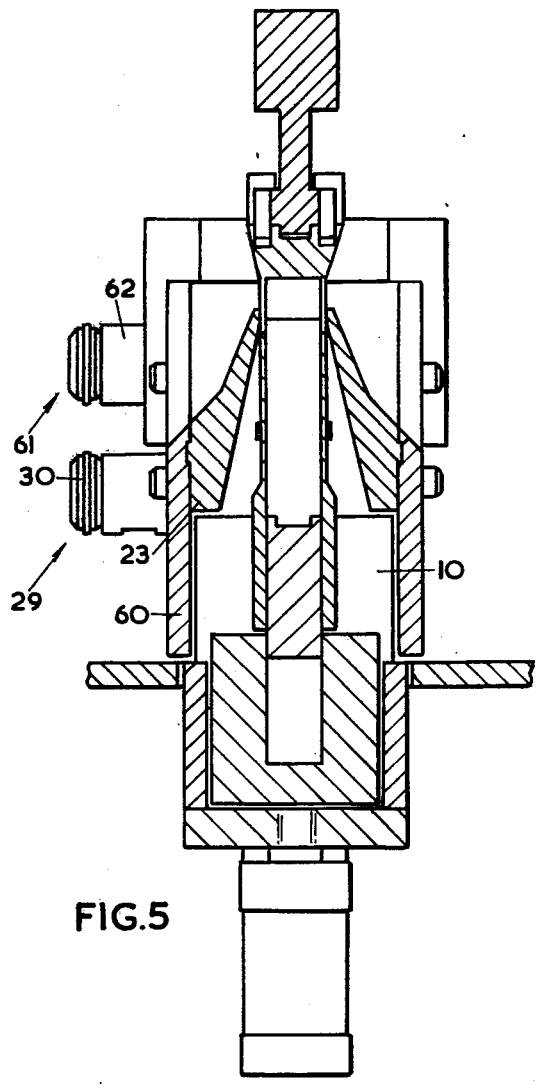
FIG. 5 is a cross sectional view of a second embodiment of a support device according to the invention; and, FIG. 6 is a side view of the device of FIG. 5.
Figure 6:
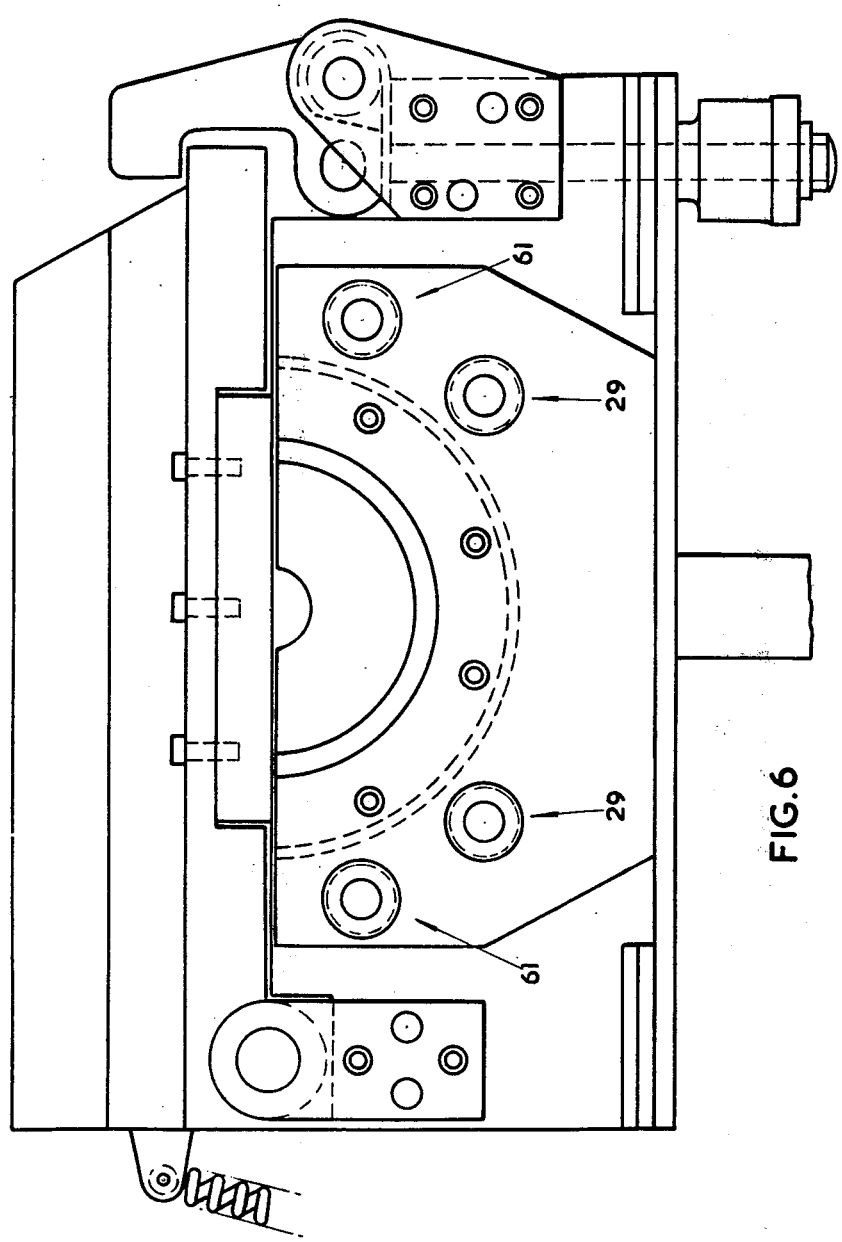

The jig shown in FIGS. 5 and 6 is similar to that shown in FIGS. 1 to 4 except that the two pivotally mounted clamping plates 20 are replaced by a pair of parallel clamping plates 60. All similar parts of the jigs of FIGS. 1 to 4 and FIGS. 5 and 6, respectively, are given like reference numerals. The clamping members 60, which are free of the block 10, are held in a parallel relationship to one another by the pair of clamping devices 29 and a further pair of similar devices 61, which each, likewise, comprise an hydraulic ram 62 having a headed piston which extends through the plates 60 and an aligned bore through the block 10. The plates 60 are moved to a clamping position by actuating the devices 29 and 61 by supplying hydraulic fluid thereto, thereby drawing the plates 60 towards one another, such movement being, in this embodiment, linear rather than the pivotal movement of plates 20 in the first embodiment. When the supply of hydraulic fluid to the devices 29 and 61 is released the plates 20 are moved by springs, similar to springs 33 in the first embodiment, to a free position in which a finished bearing can be ejected from the support by plates 45.

What we claimed is:

1. A device for locating parts of a flanged plain bearing which are to be joined together to form the finished article, which device comprises a body part having an arcuate seating surface extending across an upper surface of the body part, at least one substantially planar side surface area adjoining the seating surface, means to clamp an arcuate bearing shell in the seating surface and means to clamp a separate bearing flange against the side surface area with the edges of the arcuate shell and the flange to be joined together, in abutment and exposed for welding by a laser beam, which latter means includes a movably mounted clamping member for engaging the face of the flange remote from said surface area, and means to move the clamping member between a clamping position in which it exerts a force against a flange to hold it against the side surface and a free position in which such force is released.

2. A device as claimed in claim 1 wherein said clamping member is mounted for pivotal movement.

3. A device as claimed in claim 1 wherein the clamping member is mounted for linear movement between said clamping and free positions.

4. A device as claimed in claim 1 wherein projections are provided on the side surface area which projections are located for engagement by the arcuate edge, remote from the edge to be welded, of a flange located in use against the side surface area so as to facilitate the correct location of the flange before the clamping force is applied.

5. A device as claimed in claim 1 including a pair of movably mounted clamping members for clamping respective flanges against planar surfaces on opposite sides of the body part, and means to move the elements into their clamping positions.

6. A device as claimed in claim 5 wherein said clamping members are mounted for pivotal movement.

7. A device as claimed in claim 6 wherein said means to move the elements comprise contractable means engageable with the members at positions spaced from their pivots, the arrangement being such that when such means are contracted the members are pivoted towards one another so as to exert and maintain clamping forces on the flanges.

8. A device as claimed in claim 5 wherein the clamping elements are mounted for linear movement towards and away from one another.

9. A device as claimed in claim 8 wherein said means to move the elements comprise at least two contractable assemblies extending through the body part and connecting the elements to support them in a parallel relationship on opposite sides of the block, whereby contraction of such assemblies causes the elements to move linearly towards one another in said clamping position.

10. A device as claimed in claim 1 wherein the body part has a detachable upper section on which the seating surface and said side surface area(s) are provided, which upper section can readily be replaced by a similar insert for manufacture of a bearing having different dimensions.

11. A device as claimed in claim 10 wherein the clamping members have removable end sections for engagement with bearing flanges, which sections can be replaced by other such end sections of different dimensions to accomodate different size bearings in the device.

12. A device as claimed in claim 1 including means for ejecting the components from the seating which means comprise an ejector member guided for reciprocation along said planar side surface and means to reciprocate the ejector member to act against a portion of a finished component located in use in said seating surface.

13. A device as claimed in claim 1 wherein said means to clamp an arcuate bearing shell in said seating surface comprise a head part pivotally mounted on the body part and movable into a clamping position in which it bears against the parting lines of a bearing shell to clamp such shell in position in said seating surface.

14. A device as claimed in claim 13 wherein the head part is biassed to position other than said clamping position and in which a bearing shell can be inserted or removed from the seating surface and there is provided releasable latching means engageable with the head part to hold the latter against its bias in said clamping position.

* * * * *